(12) United States Patent
Carney Landow et al.

(10) Patent No.: US 11,671,468 B2
(45) Date of Patent: Jun. 6, 2023

(54) AUTHENTICATED CALLING VOICEMAIL INTEGRATION

(71) Applicant: DISH Wireless L.L.C., Englewood, CO (US)

(72) Inventors: Kate Megan Carney Landow, Denver, CO (US); Nereus Lobo, Englewood, CO (US); Arielle Smith, Denver, CO (US); Allyson Lotz, Denver, CO (US); Bin Xu, Centennial, CO (US)

(73) Assignee: DISH Wireless L.L.C., Littleton, CO (US)

( * ) Notice: Subject to any disclaimer, the term of this patent is extended or adjusted under 35 U.S.C. 154(b) by 0 days.

(21) Appl. No.: 17/445,375

(22) Filed: Aug. 18, 2021

(65) Prior Publication Data

US 2022/0060520 A1 Feb. 24, 2022

Related U.S. Application Data

(60) Provisional application No. 63/067,230, filed on Aug. 18, 2020.

(51) Int. Cl.
*H04L 65/1104* (2022.01)
*H04M 1/57* (2006.01)

(52) U.S. Cl.
CPC ......... *H04L 65/1104* (2022.05); *H04M 1/575* (2013.01)

(58) Field of Classification Search
CPC .......................... H04L 65/1104; H04M 1/575
USPC ......................................................... 370/352
See application file for complete search history.

(56) References Cited

U.S. PATENT DOCUMENTS

| | | | |
|---|---|---|---|
| 10,721,352 B2* | 7/2020 | Sharpe | H04M 3/4365 |
| 11,082,557 B1* | 8/2021 | Ding | H04M 3/42382 |
| 2007/0150773 A1* | 6/2007 | Srivastava | H04L 65/1079 |
| | | | 714/49 |
| 2009/0089409 A1* | 4/2009 | Pasko | G06F 21/6218 |
| | | | 709/223 |
| 2017/0339272 A1* | 11/2017 | Obaidi | G10L 25/51 |
| 2020/0154272 A1* | 5/2020 | Uy | H04W 12/04 |
| 2021/0099573 A1* | 4/2021 | van Rensburg | H04M 3/436 |
| 2021/0377389 A1* | 12/2021 | Combellas | H04M 3/4365 |
| 2022/0124195 A1* | 4/2022 | Lu | H04M 3/42357 |
| 2022/0360663 A1* | 11/2022 | Kempson | H04M 3/42306 |

* cited by examiner

*Primary Examiner* — Binh Kien Tieu
(74) *Attorney, Agent, or Firm* — Kilpatrick Townsend & Stockton

(57) ABSTRACT

Various arrangements for providing authenticated caller information for voicemail are presented herein. A terminating telephony service provider system can receive a request to connect a telephone call, the request comprising a session initiation protocol (SIP) identity header. The terminating telephony service provider system can perform a verification based on the SIP identity header. A voicemail may be created based on audio received from the calling party via the telephone call. SIP header information can be stored and mapped to the voicemail. The terminating telephony service provider system can then output, to a called party user equipment (UE), an indication of the voicemail with an indication of the verification based on the SIP identity header.

20 Claims, 5 Drawing Sheets

AUTHENTICATED CALLING VOICEMAIL INTEGRATION

CROSS-REFERENCE TO RELATED APPLICATIONS

This application claims priority to U.S. Provisional Patent Application No. 63/067,230, filed on Aug. 18, 2020, entitled "Authenticated Calling Voicemail Integration," the disclosure of which is hereby incorporated by reference in its entirety for all purposes.

BACKGROUND

A SIP (Session Initiation Protocol) header can allow for a telephone call to be cryptographically signed. STIR (Secure Telephone Identity Revisited) and SHAKEN (Secure Handling of Asserted information using toKENs) are telecommunication standards that use a cryptographically-signed SIP header in order to help verify the origin of a telephone call. While information about such a signed telephone call can be useful when determining whether a telephone call should be permitted to be connected with a called party, the information may be lost if the called party is not available to receive the call.

SUMMARY

Various embodiments are described related to a method for providing authenticated caller information for voicemail. In some embodiments, a method for providing authenticated caller information for voicemail is described. The method may comprise receiving, by a terminating telephony service provider system, a request to connect a telephone call, the request comprising a session initiation protocol (SIP) identity header. The telephone call may be mapped to an originating telephone number and was originated by a calling party. The method may comprise performing, by the terminating telephony service provider system, a verification based on the SIP identity header. The method may comprise routing, by the terminating telephony service provider system, the telephone call to a voicemail system. The method may comprise creating, by the terminating telephony service provider system, a voicemail based on audio received from the calling party via the telephone call. The method may comprise storing, by the terminating telephony service provider system, information from the SIP header mapped with a voicemail. The method may comprise outputting, by the terminating telephony service provider system to a called party user equipment (UE), an indication of the voicemail with an indication of the verification based on the SIP identity header.

Embodiments of such a method may include one or more of the following features: performing the verification based on the SIP identity header may comprise transmitting, by the terminating telephony service provider system, the received SIP identity header to a verification service system. Performing the verification based on the SIP identity header may comprise receiving, by the terminating telephony service provider system, from the verification service system, a verification result. The method may comprise receiving, by the terminating telephony service provider system, a request to retrieve voicemail from the UE the called party. The method may comprise transmitting, by the terminating telephony service provider system, to the UE of the called party, the voicemail and the stored information from the SIP header mapped with the voicemail. The terminating telephony service provider system may be in communication with a 5G core of a 5G New Radio (NR) cellular network. Routing the telephone call to the voicemail system may be based at least in part on the verification result. The verification result may classify the telephone call as: verified; not verified; or partially verified. The indication of the voicemail output to the called party UE may include an indication of verified; not verified; or partially verified. Attempting, by the terminating telephony service provider system, to complete the telephone call with the called party UE, wherein routing the telephone call to the voicemail system may be performed in response to unsuccessfully attempting to complete the telephone call with the called party UE. The method may comprise calculating a reputation score using the SIP identity header. The method may comprise outputting an indication of the reputation score to the called party UE for presentation in association with the indication of the voicemail. Calculating the reputation score may be performed using a machine learning model trained using SIP header information collected from a plurality of telephone calls. The indication of the reputation score may be only presented in association with the indication of the voicemail when the performed verification indicates the telephone call is either unverified or partially verified.

In some embodiments, a voicemail system for providing authenticated caller information is described. The system may comprise a 5G cellular network. The 5G cellular network may be operated by a terminating service provider. The 5G cellular network may be configured to receive a request to connect a telephone call, the request comprising a session initiation protocol (SIP) identity header. The telephone call may be mapped to an originating telephone number and was originated by a calling party outside of the 5G cellular network. The 5G cellular network may be configured to perform a verification based on the SIP identity header. The system may comprise a voicemail service system, in communication with a 5G core of the 5G cellular network. The voicemail service system may be configured to create a voicemail based on audio received from the calling party via the telephone call. The voicemail service system may be configured to store information from the SIP header mapped with a voicemail. The voicemail service system may be configured to output, to a called party user equipment (UE), an indication of the voicemail with an indication of the verification based on the SIP identity header.

Embodiments of such a system may include one or more of the following features: the system may further comprise a plurality of UE, the plurality of UE comprising the called party UE. The 5G cellular network being configured to perform the verification based on the SIP identity header may comprise the 5G cellular network being configured to transmit the received SIP identity header to a verification service system. The 5G cellular network being configured to perform the verification based on the SIP identity header may comprise the 5G cellular network being configured to receive from the verification service system, a verification result. The voicemail service system may be further configured to receive a request to retrieve voicemail from the UE the called party. The voicemail service system may be further configured to transmit, to the UE of the called party, the voicemail and the stored information from the SIP header mapped with the voicemail. Routing the telephone call to the voicemail system may be based at least in part on a verification result of the verification. The verification result may classify the telephone call as: verified; or not verified. The indication of the voicemail output to the called party UE may include an indication of verified; not verified; or partially verified. The 5G cellular network may be further configured to attempt to complete the telephone call with the called party UE. The 5G cellular network may route the telephone call to the voicemail system in response to unsuccessfully attempting to complete the telephone call with the called party UE. The system may further comprise a certificate authority system distinct from the 5G cellular network, the certificate authority system being configured to calculate a reputation score using the SIP identity header. The certificate authority system may be configured to output an indication of the reputation score to the 5G cellular network for presentation in association with the indication of the voicemail at the called party UE. The certificate authority system being configured to calculate the reputation score may comprise using a machine learning model trained using SIP header information collected from a plurality of telephone calls. The indication of the reputation score may be presented in association with the indication of the voicemail when the performed verification indicates the telephone call is unverified.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In embodiments detailed herein, when a SIP header has been verified, the telephone call may be attempted to be completed. On the called party's user equipment (UE), information from the SIP header may be presented. The information presented can include information about the calling party. For example, information about the calling party could include a name, a telephone number, a location, and/or a graphic of the calling party. If a calling party is a business, the information may be: a return phone number for the business; a name of the business; a location of the business; and/or a graphic or logo of the business, possibly along with some verification badge.

If the called party is available at the time of the telephone call and views their UE, information obtained from the SIP header may be presented by the UE or otherwise output by the UE. This information can help the called party decide whether she desires to answer the call. However, if the called party is not available, such as if the called party does not accept the call or the called party's mobile device is not currently connected to the wireless network, the call may be redirected to a voicemail system of the called party's telephony provider, which can be referred to as a terminating service provider.

If a voicemail message is left by the calling party, information from the SIP header may conventionally be discarded. Rather, in embodiments detailed herein, the entirety or a portion of information from the SIP header is stored and mapped to the voicemail message left by the calling party. When the voicemail is retrieved or accessed by the calling party, information from the SIP header can be presented to the called party via the called party's UE.

Figure 1A:
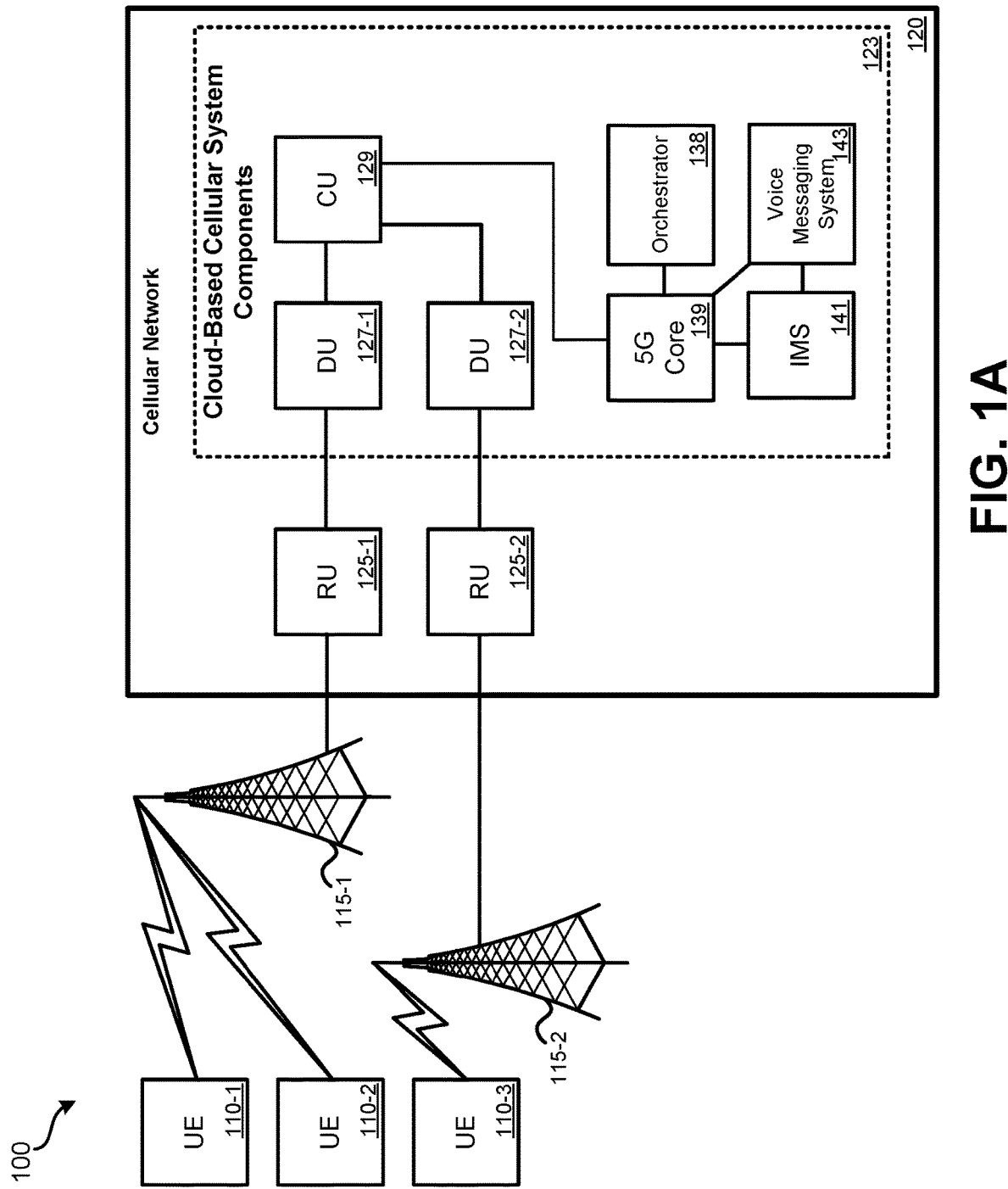
FIG. 1A illustrates an embodiment of a 5G cellular network.

In some embodiments, SIP header integration with voicemail is performed in a 5G New Radio (NR) cellular network. In other embodiments, a different form of telephony system may be used. Performing SIP header integration with voicemail in a 5G NR cellular network may be integrated as part of the 5G core as software since some or all of the components of the 5G core may be virtual and distributed across a cloud-based infrastructure. FIG. 1A illustrates an embodiment of a cellular network system 100 ("system 100"). System 100 can include a 5G New Radio (NR) cellular network; other types of cellular networks are also possible. System 100 100 can include: UE 110 (UE 110-1, UE 110-2, UE 110-3); base station 115; cellular network 120; radio units 125 ("RUs 125"); distributed units 127 ("DUs 127"); centralized unit 129 ("CU 129"); 5G core 139, and orchestrator 138. FIG. 1A represents a component level view. In an open radio access network (O-RAN), because components can be implemented as software in the cloud, except for components that need to receive and transmit RF, the functionality of the various components can be shifted among different servers to accommodate where the functionality of such components is needed.

UE 110 can represent various types of end-user devices, such as smartphones, cellular modems, cellular-enabled computerized devices, sensor devices, gaming devices, access points (APs), any computerized device capable of communicating via a cellular network, etc. Depending on the location of individual UEs, UE 110 may use RF to communicate with various base stations of cellular network 120. As illustrated, two base stations 115 (BS 115-1, 115-2) are illustrated. Real-world implementations of system 100 can include many (e.g., thousands) of base stations, RUs, DUs, and CUs. BS 115 can include one or more antennas that allow RUs 125 to communicate wirelessly with UEs 110. RUs 125 can represent an edge of cellular network 120 where data is transitioned to wireless communication. The radio access technology (RAT) used by RU 125 may be 5G New Radio (NR), or some other RAT. The remainder of cellular network 120 may be based on an exclusive 5G architecture, a hybrid 4G/5G architecture, a 4G architecture, or some other cellular network architecture.

One or more RUs, such as RU 125-1, may communicate with DU 127-1. One or more DUs, such as DU 127-1, may communicate with CU 129. Collectively, RUs, DUs, and CUs create a gNodeB, which serves as the radio access network (RAN) of cellular network 120. CU 129 can communicate with 5G core 139. The specific architecture of cellular network 120 can vary by embodiment. Edge cloud server systems outside of cellular network 120 may communicate, either directly, via the Internet, or via some other network, with components of cellular network 120. For example, DU 127-1 may be able to communicate with an edge cloud server system without routing data through CU 129 or 5G core 139. Other DUs may or may not have this capability.

Figure 1B:
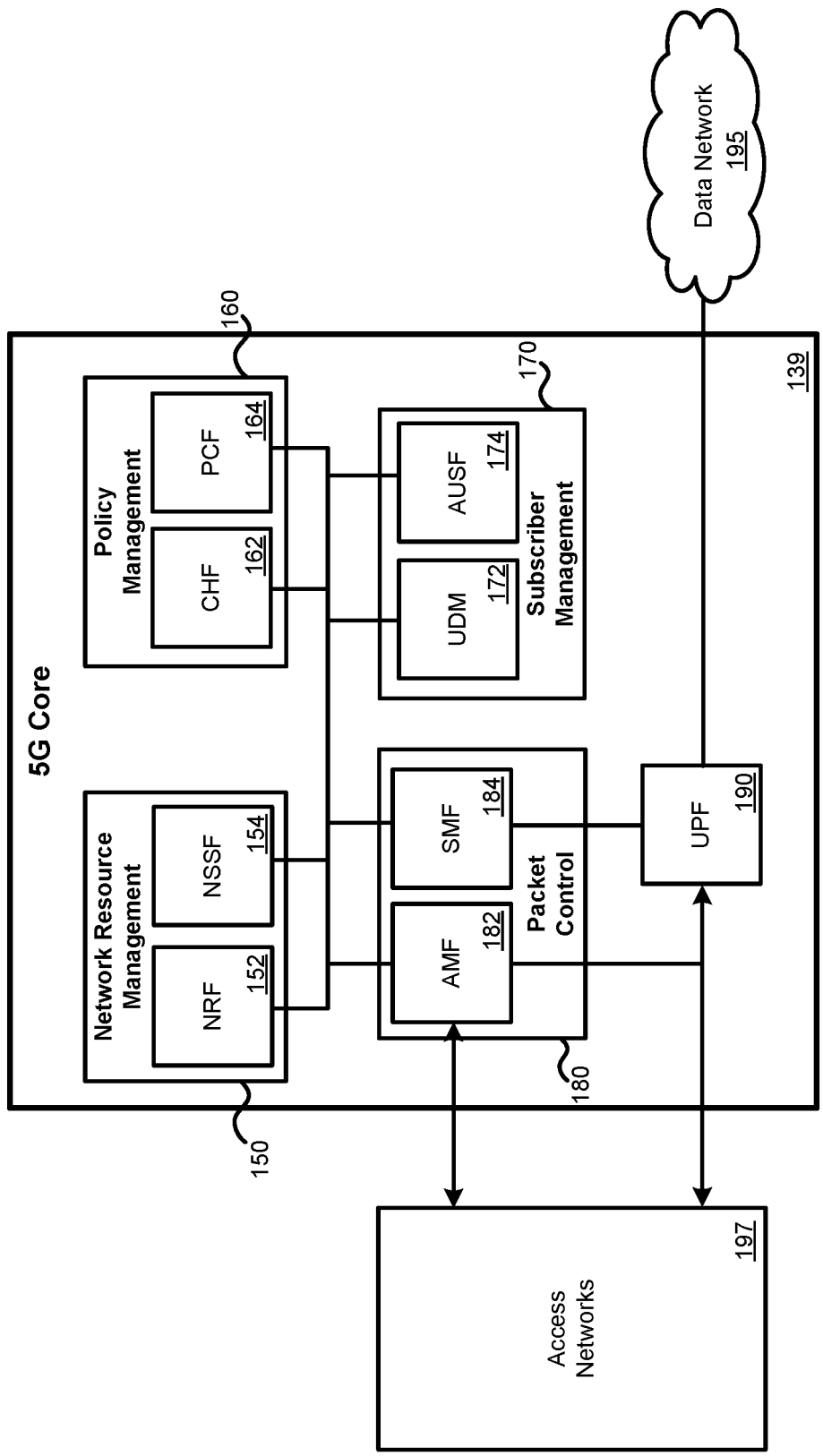
FIG. 1B illustrates an embodiment of a 5G core of a 5G cellular network.

Further detail regarding 5G Core 139 is provided in relation to FIG. 1B. 5G core 139, which can be physically distributed across data centers or located at a central national data center (NDC), can perform various core functions of the cellular network. 5G core 139 can include: network resource management components 150; policy management components 160; subscriber management components 170; and packet control components 180. Individual components may communicate on a bus, thus allowing various components of 5G core 139 to communicate with each other directly. 5G core 139 is simplified to show some key components. Implementations can involve additional other components.

Network resource management components 150 can include: Network Repository Function (NRF) 152 and Network Slice Selection Function (NSSF) 154. NRF 152 can allow 5G network functions (NFs) to register and discover each other via a standards-based application programming interface (API). NSSF 154 can be used by AMF 182 to assist with the selection of a network slice that will serve a particular UE.

Policy management components 160 can include: Charging Function (CHF) 162 and Policy Control Function (PCF) 164. CHF 162 allows charging services to be offered to authorized network functions. A converged online and offline charging can be supported. PCF 164 allows for policy control functions and the related 5G signaling interfaces to be supported.

Subscriber management components 170 can include: Unified Data Management (UDM) 172 and Authentication Server Function (AUSF) 174. UDM 172 can allow for generation of authentication vectors, user identification handling, NF registration management, and retrieval of UE individual subscription data for slice selection. AUSF 174 performs authentication with UE.

Packet control components 180 can include: Access and Mobility Management Function (AMF) 182 and Session Management Function (SMF) 184. AMF 182 can receive connection and session related information from UE and is responsible for handling connection and mobility management tasks. SMF 184 is responsible for interacting with the decoupled data plane, creating updating and removing Protocol Data Unit (PDU) sessions, and managing session context with the User Plane Function (UPF).

User plane function (UPF) 190 can be responsible for packet routing and forwarding, packet inspection, QoS handling, and external PDU session for interconnecting with a Data Network (DN) 195 (e.g., the Internet) or various access networks 197. Access networks 197 can include the RAN of cellular network 120 of FIG. 1A.

While FIGS. 1A and 1B illustrate various components of cellular network 120, it should be understood that other embodiments of cellular network 120 can vary the arrangement, communication paths, and specific components of cellular network 120. While RU 125 may include specialized radio access componentry to enable wireless communication with UE 110, other components of cellular network 120 may be implemented using either specialized hardware, specialized firmware, and/or specialized software executed on a general-purpose server system. In an O-RAN arrangement, specialized software on general-purpose hardware may be used to perform the functions of components such as DU 127, CU 129, and 5G core 139. Functionality of such components can be co-located or located at disparate physical server systems. For example, certain components of 5G core 139 may be co-located with components of CU 129.

In a possible O-RAN implementation, DUs 127, CU 129, 5G core 139, orchestrator 138, IP Multimedia Subsystem (IMS) 141, and/or voice messaging system 143 can be implemented virtually as software being executed by general-purpose computing equipment, such as in a data center. Therefore, depending on needs, the functionality of a DU, CU, and/or 5G core may be implemented locally to each other and/or specific functions of any given component can be performed by physically separated server systems (e.g., at different server farms). For example, some functions of a CU may be located at a same server facility as where the DU is executed, while other functions are executed at a separate server system.

IMS 141 can be in communication with 5G core 139 and voice messaging system 143. IMS 141 is the subsystem that enables live voice and communication services on 4G and 5G networks. IMS 141 allows for service providers to build new services that interact with data being exchanged with other voice networks worldwide, such a service can be voice messaging system 143. IMS 141 allows for use of routable phone numbers (MSISDN) worldwide and enforcement of various quality of service (QoS) metrics relevant to interactive calling.

Voice messaging system 143 represents the system that may be implemented by a terminating service provider system to enhance voicemail functionality based on SIP header data. Further detail regarding voice messaging system 143 is provided in relation to voicemail service system 232, voicemail database 236, and SIP header database 234, in relation to FIG. 2.

Kubernetes, or some other container orchestration platform, can be used to create and destroy the logical DU, CU, 5G core units and subunits as needed for the cellular network 120 to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU is no longer needed, Kubernetes can allow for removal of the logical DU. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network.

Figure 2:
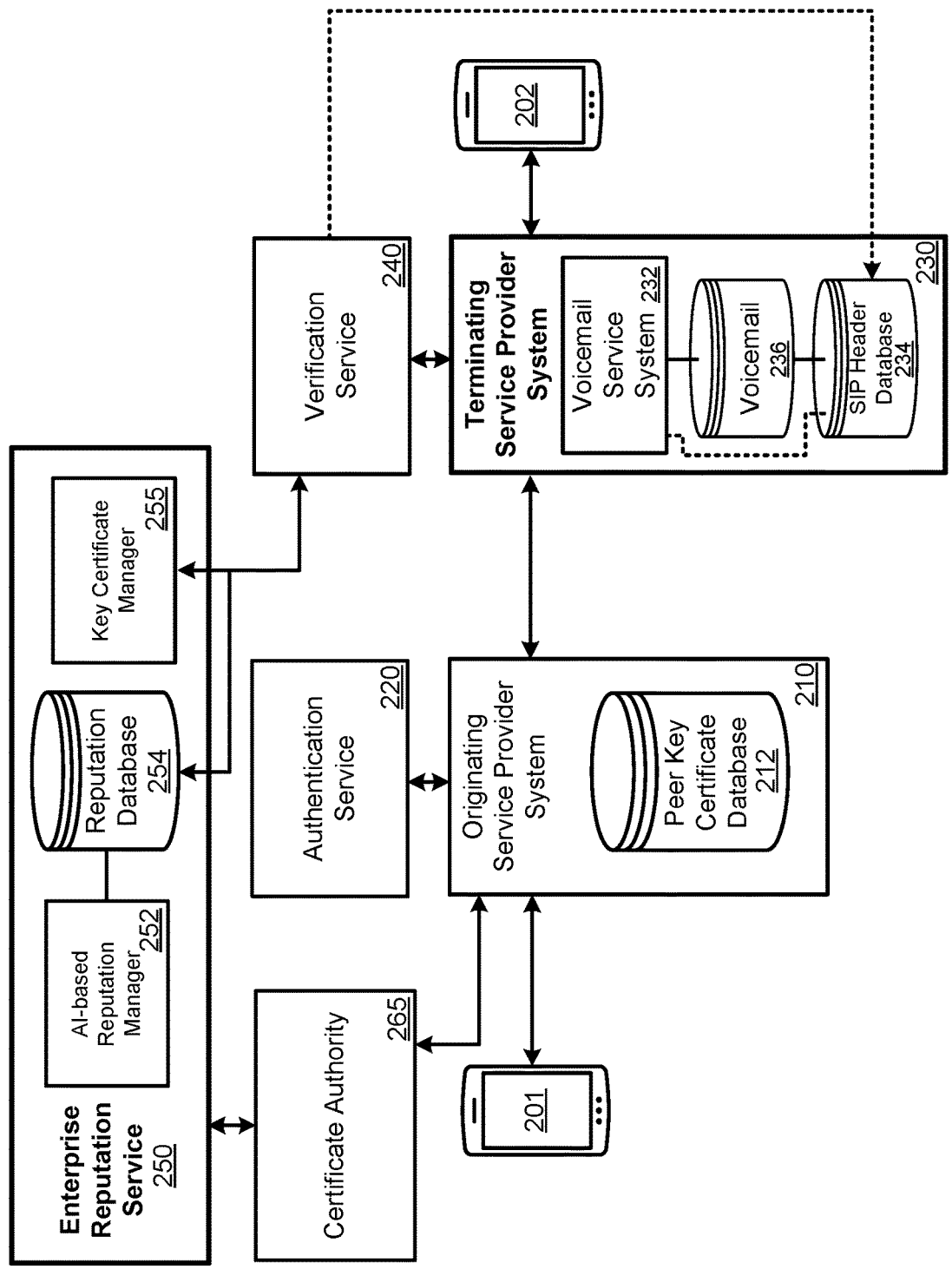
FIG. 2 illustrates an embodiment of an authenticated calling voicemail integration system.

Orchestrator 138 can allow for the instantiation of new cloud-based components of cellular network 120, including components of terminating service provider system 230 detailed in relation to FIG. 2. As an example, to instantiate a new DU, orchestrator 138 can perform a pipeline of calling the DU code from a software repository incorporated as part of, or separate from cellular network 120, pulling corresponding configuration files (e.g., helm charts), creating Kubernetes nodes/pods, loading DU containers, configuring the DU, and activating other support functions (e.g., Prometheus, instances/connections to test tools).

A network slice functions as a virtual network operating on cellular network 120. Cellular network 120 is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at RU 125-1 and DU 127-1, a second set of network slices, which may only partially overlap or may be wholly different than the first set, may be reserved at RU 125-2 and DU 127-2.

Further, particular cellular networks slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

Components such as DUs 127, CU 129, orchestrator 138, and 5G core 139 may include various software components that are required to communicate with each other, handle large volumes of data traffic, and be able to properly respond to changes in the network. In order to ensure not only the functionality and interoperability of such components, but also the ability to respond to changing network conditions and the ability to meet or perform above vendor specifications, significant testing must be performed.

Figure 3:
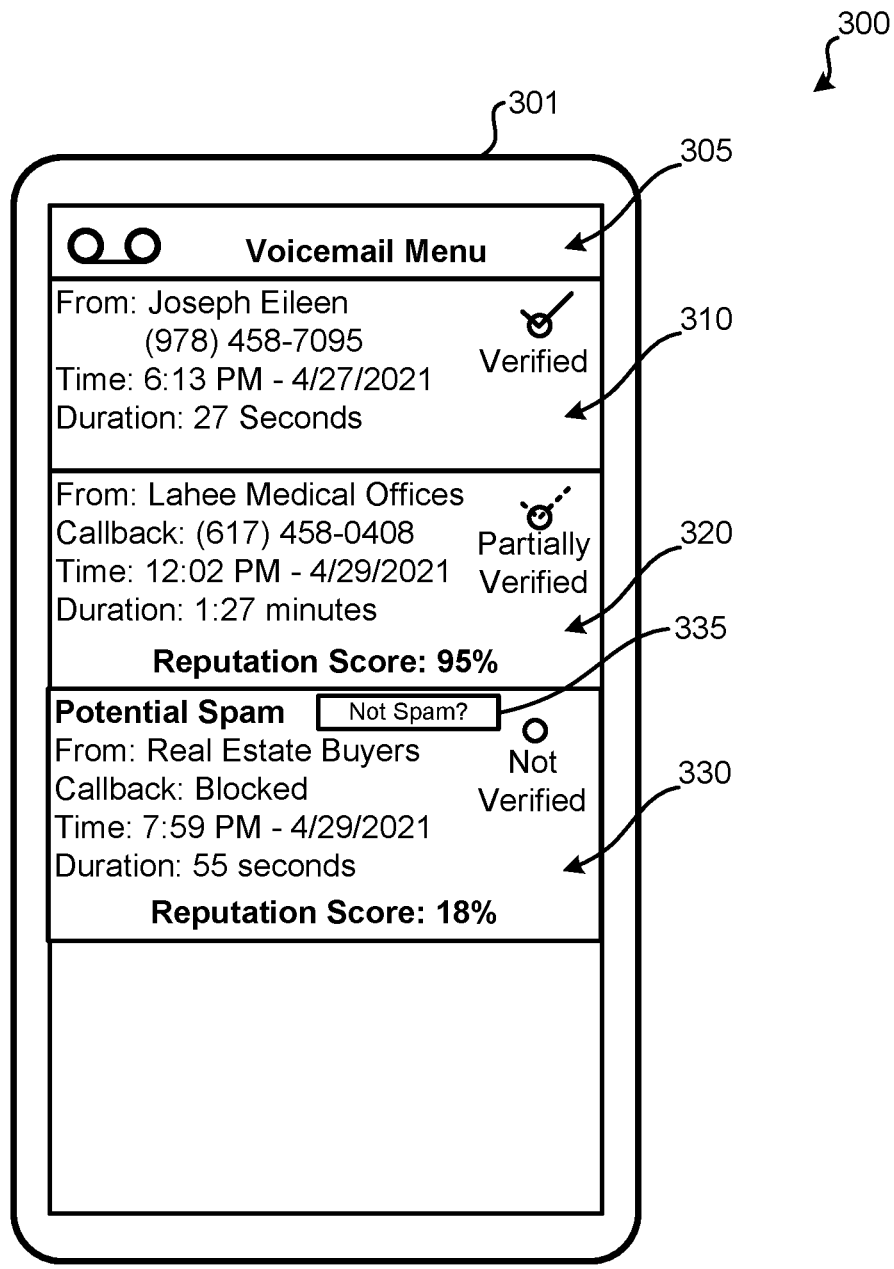
FIG. 3 illustrates an embodiment of a voicemail interface presented by a called party UE.

Detail regarding SIP header and voicemail integration into a telephony network, such as cellular network system 100 of FIG. 1 is provided in relation to FIGS. 2 and 3. FIG. 2 illustrates an embodiment of an authenticated calling voicemail integration system 200 ("system 200"). System 200 can include: calling party user equipment (UE) 201 ("UE 201"); originating service provider 210; authentication service 220; terminating service provider system 230; verification service 240; enterprise reputation service 250; certificate authority 265; and called party UE 202 ("UE 202"). At a high level, a user of UE 201 is attempting to call a user of UE 202. The user of UE 201 may have dialed a telephone number of the user of UE 202.

UE 201 can represent a cellular phone, smartphone, smart watch, IoT device, landline, VoIP handset, cellular, or VoIP enabled device. UE 201 may be a UE of 110 that is connected with the same telephony system as UE 202 or may be connected with some other telephony provider. UE 201 may connect with originating service provider system 210, which is the telephony service provider for UE 201, to attempt to complete the telephone call. The originating service provider system 210 does not necessarily need to be cellular; rather originating service provider system 210 may alternatively be a land-line or VoIP provider. Originating service provider system 210 is operated by an entity distinct from terminating service provider system 230, therefore causing the need for the telephone call to be authenticated/validated. Prior to connecting the requested telephone call, originating service provider system 210 may perform a secure telephone identity authentication service (STI-AS) which results in an encrypted SIP Identity header being created that includes various pieces of information. SIP Header information can include: attestation level; date; time; called telephone number; calling telephone number; originating identifier; an address of a certificate repository; a signature; and/or an indication of an encryption algorithm. A SIP INVITE as created and sent by originating service provider system 210 as a message may obtain at least some SIP Header information from authentication service 220. Authentication service 220 can be operated by originating service provider system 210 or by a separate entity.

In some situations, the calling party may legitimately be using an alternative number (that is also verified) that differs from a listed callback number. For example, a doctor may desire to call a patient from his cell phone, but have the callback number listed as the doctor's office telephone line. As another example, a call center employee may call a customer, but the callback number may be listed as a general customer service hotline rather than the employee's specific telephone number. If the alternate telephone number is verified and includes SIP header data that matches verification information for the listed callback number, the telephone call may be eligible to be verified and completed. If the SIP INVITE that includes the SIP header data does not match verification information for the listed callback number, the called party operating UE 202 can be notified that there is a potential mismatch between the identity indicated for the calling party and the true identity of the calling party (such as in the form of a partially-verified calling party).

Certificate authority 265 can represent a computer server system or cloud-executed service through which various telephony providers can be authenticated. A telephony provider can obtain a key certificate that is used to sign telephone calls by providing a token to certificate authority 265. A private key that is used to encrypt a SIP INVITE may be held securely by the telephony provider, while a public key that is used to decrypt the SIP INVITE may be accessible through certificate authority by other telephony providers.

The originating service provider system 210 may determine an attestation level that is included as part of the SIP header information in the SIP INVITE. There may be three or four attestation levels available: "Full Attestation" (or fully verified) may indicate that the service provider has authenticated the calling party and they are authorized to use the calling number. Partial attestation (or partial verification) may indicate that the service provider has authenticated the call origination, but cannot verify the calling party is authorized to use the calling phone number. "Gateway Attestation" (gateway verification) may indicate that the service provider has authenticated from where it received the call, but cannot authenticate the call source. For example, a call received via an international gateway may only be verified up to the international gateway. "No Attestation" or no verification can indicate that the calling party is not authorized to use the calling number.

In response to a telephone call attempting to be completed by UE 201, originating service provider system 210 may examine the telephone number indicated for the telephone call from UE 201 and/or an indication of a customer from which the telephone call is allegedly originating. It may be possible for UE 201, or a system that manages calls between UE 201 and originating service provider system 210 to spoof another telephone number, such as by using a gateway system for VoIP communications. In some instances, this action may be legitimate (e.g., to direct a customer to the correct customer service number) or it may be nefarious (e.g., a scam artist hiding the origin of their call).

Originating service provider system 210 may transmit the created SIP INVITE (and the included SIP Header) to authentication service 220 or, authentication service 220 may create the SIP INVITE. Authentication service 220 may be operated by originating service provider system 210 or a third party. The SIP header information within the SIP INVITE may be updated by authentication service 220 to include additional information. For example, information such as a PASSporT header, PASSporT payload, PASSporT signature, indication or encryption algorithm (or the algorithm itself) and a location of a certificate repository may be added to the SIP INVITE by authentication service 220. PASSporT can refer to a Personal Assertion Token (PASSporT) for Signature-based Handling of Asserted information using toKENs (SHAKEN).

Once the SIP INVITE with the SIP Header has been created, encrypted using a private key of originating service provider system 210, and returned to originating service provider system 210, the SIP INVITE with the encrypted SIP header can be transmitted to terminating service provider system 230. Terminating service provider system 230 can represent the telephony provider of the called party that operates UE 202 (also referred to as called-party UE 202). Terminating service provider system 230 may be a cellular network, such as detailed in relation to FIGS. 1A and 1B or may be some other form of telephony provider, such as a landline provider or VoIP provider. The connection between originating service provider system 210 and terminating service provider system 230 may occur via the Internet or a direct communication link established between the service provider systems.

Terminating service provider system 230 can route the encrypted SIP INVITE with the SIP header to verification service 240. Verification service 240 may be performed using specialized computer hardware or special-purpose software executed by general-purpose hardware. Verification service 240 generally serves to verify the SIP INVITE with the SIP Header to ensure the calling phone number is an accurate representation of who is attempting to call UE 202. A session control element, which can be part of voicemail service system 232, may recognize the call information as a signed call being routed to voicemail that requires validation. The session control element may then extract the signed PASSporT from the call's identity header and sends the encrypted header to verification service 240, requesting validation. Verification service 240 can be operated by terminating service provider system 230, such as in the form of a separate process, or can be operated by another entity. Verification service 240 may communicate via a network, such as via the Internet, to the originating service provider's secure telephone identity certificate repository (STI-CR) and fetch the STI-CA-signed public key certificate corresponding to the signed PASSporT.

Depending on whether originating service provider system 210 is a peer or non-peer provider with terminating service provider system 230, verification can be performed differently. For a non-peer arrangement, where there is no direct agreement in place between originating service provider system 210 and terminating service provider system 230, SIP header information can be decrypted by way of enterprise reputation service 250 and certification authority 265. Verification service 240 can obtain a key from key certificate manager 255, which obtained a public key corresponding to the originating service provider from certificate authority 265. Enterprise reputation service 250 can represent a separate process, such as a cloud-based service, operated by the terminating service provider or by an entity which provides such services on behalf of the terminating service provider.

Verification service 240 can use the retrieved public key certificate from key certificate manager 255 to perform validation by decrypting the SIP HEADER information. It the signature was properly generated using the paired private key, this operation returns TRUE. It the verification fails, it returns FALSE. Further, verification service 240 can help ensure that between originating service provider system 210 and terminating service provider system 230, the calling telephone number has not been modified. Since the call signature is based on the calling telephone number, a signature verification will return FALSE if the phone number has been modified.

Verification service 240 may be part of terminating service provider system 230 or may be operated by a separate entity. For example, verification service 240 may function as part of 5G Core 139 or elsewhere within cloud-based cellular system components 123 of cellular network 120. Alternatively, verification service 240 may be accessed by terminating service provider system 230, such as via communication between 5G core 139 and the Internet.

Enterprise reputation service 250 may maintain key certificate manager 255, AI-based reputation manager 252, and reputation database 254. While the private key to encrypt SIP INVITE information may be maintained by originating service provider system 210, an associated public key used to read SIP INVITE information may be obtained by enterprise reputation service 250 from certificate authority 265 and stored by key manager 255 that is accessed by verification service 240. This arrangement allows for encrypted SIP INVITE information from another telephony provider to be decrypted.

For STIR/Shaken, a public encryption key can be stored by Enterprise reputation service 250 in key certificate manager 255. Key certificate manager 255, which can include a key management server (KMS) can function as part of enterprise reputation service 250. Voicemail service system 232 can access enterprise reputation service 250, and, specifically, key manager 255 to obtain public keys used for decryption. In an embodiment where there is not a peer relationship between originating service provider system 210 and terminating service provider system 230, the public key is obtained via certificate authority. However, if a trusted peer relationship exists, the public key may be obtained from peer key certificate database 212 of originating service provider system 210 by terminating service provider system 230 directly (that is, not via certificate authority 265). By storing the validation and accessing to the public keys used to decrypt the STIR/Shaken validation in the SIP headers, it can be possible to avoid possible fraudsters who use one telephone number to enter the system (thereby providing a valid termination) but then transfer to an unverified number to leave a voicemail. This solution can help close that loophole.

Additionally or alternatively to certification authority database 256, reputation database 254 may be maintained. Reputation database 254 may, in some embodiments, be operated by terminating service provider system 230 or could be operated by Enterprise reputation service 250. A reputation database could be accessed to determine the likelihood that a calling party's identity is accurate. The reputation database may be used in combination with artificial intelligence (AI) that analyzes data about the call (e.g., from the SIP Header, routing information). For instance, AI-based reputation manager 252 may be a software-based component executed on general purpose hardware that analyzes the routing data that accompanies a call and compare it to typical routing patterns and other metadata (e.g., location) for the calling party to determine if the caller's indicated identity is likely correct. AI-based reputation manager 252 may be a machine learning (ML) model that is trained based on truth-tagged data (i.e., mapped to an accurate or inaccurate caller identity) collected from SIP headers. Based on this training data, the machine learning model may be trained to classify routing data as accurate or inaccurate. AI-based reputation manager 252 may store indications of identities determined to be inaccurate or accurate in reputation database 254.

Reputation database 254 may be proprietary to the terminating service provider and may be operated as part of enterprise reputation service 250 and utilized by multiple telephony service providers (as illustrated in FIG. 2). By maintaining reputation database 254, if certain information with a SIP Header of a telephone call properly matches with data retrieved from reputation database 254 or analyzed by AI-based reputation manager 252, the telephone call may be trusted and may be permitted to include an indication of a call back number that varies from the telephone number from which the call originates and/or a score can be calculated and provided to the called UE for output. Such use of AI-based reputation manager 252 and/or reputation database 254 allows identity details to persist beyond a particular telephone call. That is, through the use of AI-based reputation manager 252 and/or reputation database 254, an identity that is used to make a number of verified telephone calls can potentially become trusted to a greater degree than other telephone numbers.

The results of verification service 240 communicating with enterprise reputation service 250 (or, possibly, by obtaining the public key from peer key certificate database 212 from originating service provider system 210 in a peer relationship) are returned to terminating service provider system 230. If the telephone call is verified, terminating service provider system 230 completes the call between UE 201 and UE 202. If the telephone call is not verified, terminating service provider system 230 may block the telephone call, may label it as potentially spam, or otherwise label the telephone call. Ultimately, the user of UE 202 may have the decision whether to accept the telephone call, even if labelled as potential spam or otherwise labeled. In some embodiments, unverified calls may automatically be routed to voicemail or to an automated answering system that presents text on UE 202 indicative of what is being said by the caller.

Assuming the telephone call is attempted to be connected by terminating service provider system 230 with UE 202, the telephone call may only be completed if a user of UE 202 accepts the telephone call. The user of UE 202 (via user input) or an application or operating system of UE 202 may decline the telephone call, such as if the user has set a "do not disturb" status. Alternatively, after a period of time, terminating service provider system 230 can determine that the call will not be completed and route the telephone call to voicemail service system 232. Alternatively, UE 202 may be turned off or out of range and may be unavailable for a telephone call. In any of these circumstances, the telephone call may be routed to voicemail service system 232.

Voicemail service system 232, which may include one or more computer server systems or may be implemented via a cloud-based service, may allow the calling party using UE 201 to leave an audible (and/or video) message for the user of UE 202. If the calling party decides to leave a message, the message may be stored in voicemail database 236. As part of voicemail database 236 or using a separate database indicated as SIP Header database 234, all or some information from the SIP header of the SIP INVITE of the telephone call may be stored. The stored information may be mapped to the corresponding voicemail in voicemail database 236. In some embodiments, the SIP Header database 234 is subordinate to voicemail database 236. Therefore, the data stored in fields of SIP Header database 234 may be mapped to entries present in voicemail database 236. In other embodiments, data storage arrangements other than database may be used for SIP Header data and/or voicemail data.

In some embodiments, SIP Header data may be transmitted from verification service 240 to SIP Header database 234 such that the SIP Header data does not need to be processed or forwarded by voicemail service system 232. SIP Header information may be sent to SIP Header database 234 by verification service 240 following every telephone call processed by verification service 240 for terminating service provider system 230 or for only telephone calls for which a voicemail is left. In some embodiments, a request for the SIP header information may be sent to verification service 240 based on an identifier of the telephone call. In response, SIP Header information may be sent by verification service 240 and populated into SIP Header database 234.

A notification may be transmitted to UE 202 that indicates that a voicemail is available for playback from voicemail database 236. In some embodiments, the notification may indicate whether SIP Header information has been stored for the voicemail and can include a visual indication of such SIP Header information.

At some time in the future, UE 202 or some other computerized or telephony device, may be used to access the voicemails associated with the user's account. When a user accesses the voicemail, if using UE 202, the voicemail recording may be retrieved from voicemail database 236. Additionally, corresponding information from the SIP Header of the telephone call may be retrieved from SIP Header database 234. Such information may be visually or audibly presented by UE 202 before, during, and/or after the user has listened to the voicemail. For example, while the user is listening to the voicemail, a display screen of UE 202 may present information about the calling party, such as their name, address, the calling telephone number, a logo or graphic of the entity calling, a verification badge, etc.

When a user elects to delete the voicemail, the corresponding SIP Header information may also be deleted from SIP Header database 234 or may be maintained for a predefined period of time, such as one week. In some embodiments, such information is deleted after a predefined period of time from when the voicemail was created.

FIG. 3 illustrates an embodiment 300 of a voicemail menu 305 that may be presented by called party UE 202. Voicemail menu 305 can be output for presentation in response to a user accessing a voicemail application, which might be incorporated as part of the UE's operating system or can be a separate application, that presents data obtained from voicemail service system 232, voicemail database 236, and/or SIP Header database 234.

As an example, voicemail menu 305 illustrates three voicemails. This is an example only—the number of voicemails available for playback would range from zero to some maximum number allowed in storage by the voicemail service provider. As illustrated, voicemail entry 310, voicemail entry 320, and voicemail entry 330 is present. Voicemail entry 310 indicates a voicemail that can be played back by the user and includes information that was obtained by verifying SIP Header information. A graphical element indicating verified indicates that verification service 240 was able to successfully verify the SIP Header information received with the call during which the voicemail was left. In this example, the caller's name was obtained from the SIP Header information that was stored in association with the voicemail to SIP Header database 234. Some or all of this information may be transmitted and stored by the UE for use in presenting voicemail entry 310. Therefore, for example, the voicemail's audio/video recording, the indication of verification, and SIP Header information may be transmitted to the UE ahead of playback for use in creating voicemail entry 310. Alternatively, the UE may access terminating service provider system 230 in order to obtain the necessary information to present voicemail entry 310 such as in response to a user accessing her voicemail application. This this embodiment, since the caller was fully verified, no reputation score is presented and/or calculated.

Voicemail entry 320 presents another voicemail received from another caller. Voicemail entry 320 is indicated as partially verified (partial attestation). This may be because the service provider was able to authenticate the call origination, but could not verify the calling party is authorized to use the calling phone number. For instance, in this case, the call back number was mapped to "Lahee Medical Offices." This may be a valid association, but could also have been fraudulently used. Since only a partial attestation was possible, a reputation score may be calculated and presented. In this case, the reputation score indicates a relatively high reputation, indicative, based on the analysis performed by AI-based reputation manager 252, that the callback number listed is valid. Based on this high score, the user will likely trust the voicemail is coming from a non-fraudulent source.

Additionally, the user may be permitted to provide feedback. For instance, after listening to the voicemail of voicemail entry 320, the user may be permitted to indicate whether or not the voicemail was spam/fraudulent. The feedback may be used by AI-based reputation manager 252 to improve its calculation of reputation scores.

Voicemail entry 330 presents another voicemail received from another caller. Voicemail entry 330 is indicated as unverified. This may be because the service provider was not able to authenticate the call origination via verification service 240 or verify other SIP Header information. Since no verification was possible, a reputation score can be calculated and presented. In this case, the reputation score indicates a relatively low reputation (compared to voicemail entry 320), indicative, based on the analysis performed by AI-based reputation manager 252, that SIP Header information and call are likely fraudulent. Based on this low score and/or the call being unverified, the voicemail may be labeled as spam.

Again here, the user may be permitted to provide feedback for voicemail entry 330, such as by selecting feedback element 335. For instance, after listening to the voicemail of voicemail entry 330, the user may be permitted to indicate whether or not the voicemail was actually spam/fraudulent. The feedback may be used by AI-based reputation manager 252 to improve its calculation of reputation scores.

Figure 4:
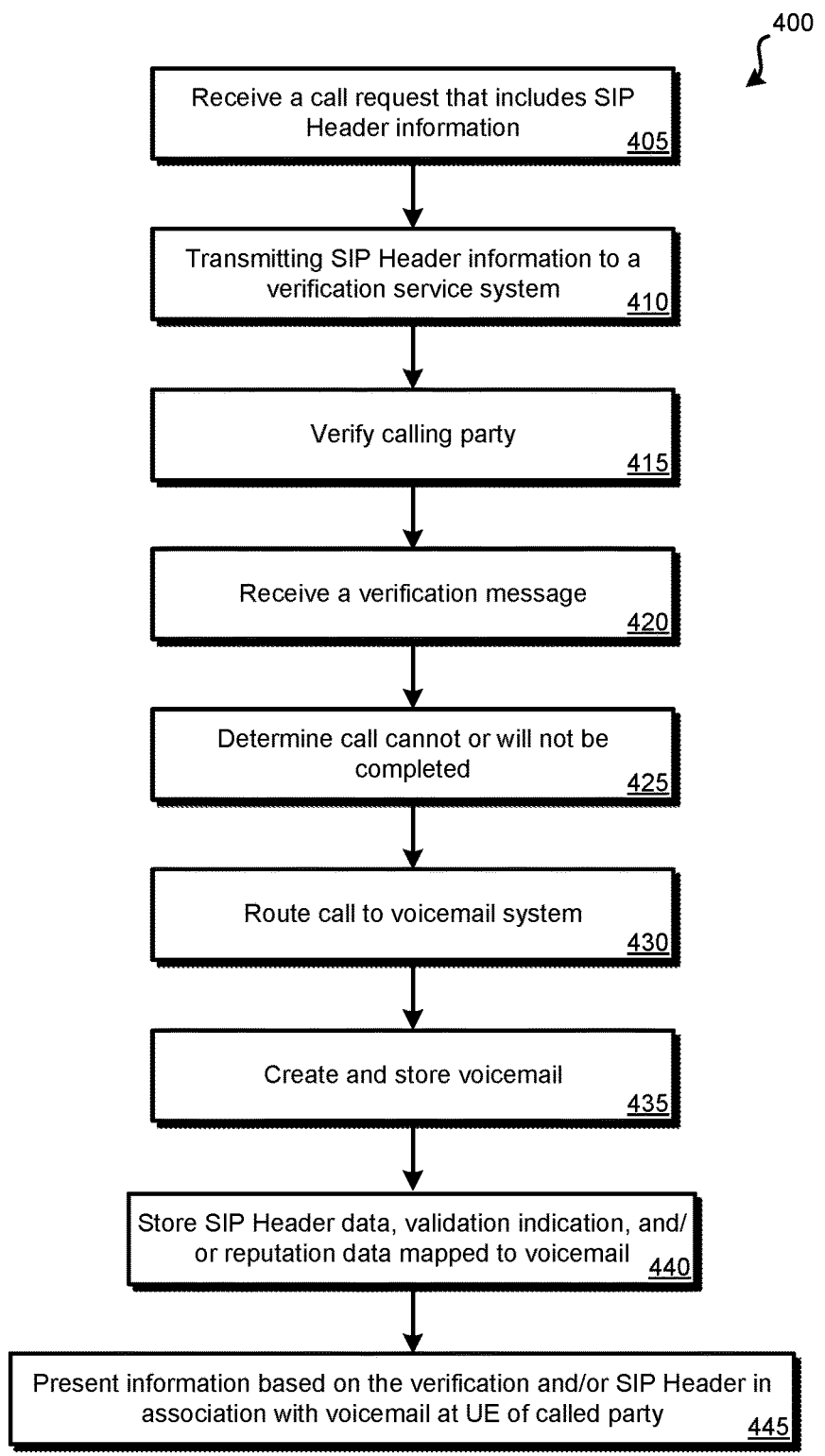
FIG. 4 illustrates an embodiment of a method for performing authenticated calling voicemail integration.

Various methods may be performed using the systems and devices of FIGS. 1A-3. FIG. 4 illustrates an embodiment of a method 400 for performing authenticated calling voicemail integration. Method 400 may be performed using system 200 of FIG. 2, which may be integrated as part of the 5G core of FIG. 1B or, more generally, may function as part of cellular network system 100A of FIG. 1 or some other form of telephony system.

At block 405, a call request from a calling party can be received by a terminating service provider system from an originating service provider system. The call request can include at least some SIP header information as part of a SIP INVITE, which may be encrypted. In response to receiving the call request, SIP header information can be transmitted to a verification service system, which may function as part of the terminating service provider system or may be a separate system in communication with the terminating service provider system.

At block 415, authentication or verification of the calling party and/or originating service provider may be performed. Block 415 can include the verification service system accessing the received encrypted SIP header information about the calling party by retrieving a security certificate (that includes an encryption key to decrypt the SIP header information) from a certificate database, which may be used by multiple telephony providers. At block 420, a response may be received from the verification service system that indicates SIP header information and/or whether the calling party is fully verified, partially verified, or not verified.

At block 425, a determination may be made that the call cannot be completed. In some embodiments, this may mean that the call was attempted to be connected by that either: the called party did not answer; the called party rejected/screened the call (e.g., pushed the call to voicemail by providing user input); the called party UE could not be located (e.g., out of range, turned off). In other embodiments, the determination of block 425 may be based on the verification message of block 415 indicating either partially verified or not verified. If such a classification is received, the call may be blocked from being completed by the terminating service provider system.

In still other embodiments, in addition or in alternate to the verification performed by the verification service system, a reputation score may be calculated. The reputation score may additionally or alternatively serve as a basis for blocking the call at block 425 from being completed by the terminating service provider system. For example, a minimum threshold value for the reputation score may be set, such that if the score is lower than the threshold, the call will be blocked from being completed at block 425. In some embodiments, a user may set a minimum threshold score at the called party UE and the UE may prevent a call from being completed if below the minimum threshold score.

At block 430, in response to determining the call cannot or will not be completed, the call is routed to a voicemail system. This can involve a generic, called-party-specific, or called-party recorded message being output to the calling party. The calling party can then be permitted to leave a video and/or audio message, assuming the voicemail box of the called party is not full or disabled.

At block 435, if a voicemail is left by the calling party (e.g., the calling party does not end the call before the opportunity to record video and/or audio), the voicemail may be created and stored by the voicemail system. SIP header information, possibly along with an indication of the verification message and/or reputation score may be stored and mapped to the voicemail. This SIP header information and the indication of verification may be stored in a voicemail database or a separate database in a linked record at block 440. In some embodiments, in alternate or in addition to the voicemail being stored using the voicemail system of the terminating service provider system, the voicemail, verification, and/or SIP Header information may be stored locally by the called-party's UE.

At block 445, at some point after the voicemail has been left, the called-party's UE may present information about the voicemail, the verification, and/or the SIP header. For example, when a user accessing a voicemail application or menu, a voicemail entry, such as the entries indicated in FIG. 3, may be presented. The information presented may incorporate at least some of the SIP header information. The information may indicate whether the calling partying and/or originating service provider system was verified, partially verified, or unverified. In some embodiments, a reputation score may be presented, which may be additionally used to classify the voicemail as spam or not spam.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for providing authenticated caller information for voicemail, the method comprising:
   receiving, by a terminating telephony service provider system, a request to connect a telephone call, the request comprising a session initiation protocol (SIP) identity header, wherein:
      the telephone call is mapped to an originating telephone number and was originated by a calling party;
   performing, by the terminating telephony service provider system, a verification based on the SIP identity header;
   routing, by the terminating telephony service provider system, the telephone call to a voicemail system;
   creating, by the terminating telephony service provider system, a voicemail based on audio received from the calling party via the telephone call;
   storing, by the terminating telephony service provider system, information from the SIP header mapped with a voicemail; and
   outputting, by the terminating telephony service provider system to a called party user equipment (UE), an indication of the voicemail with a graphical indication of the verification based on the SIP identity header, wherein:
      the graphical indication of the verification indicates the telephone call from which the voicemail was created was partially verified; and
      the telephone call being partially verified indicates that the terminating telephony service provider system has authenticated a call origination but did not verify the calling party is authorized to use the originating telephone number.

2. The method for providing authenticated caller information for voicemail of claim 1, wherein performing the verification based on the SIP identity header comprises:
   transmitting, by the terminating telephony service provider system, the received SIP identity header to a verification service system; and
   receiving, by the terminating telephony service provider system, from the verification service system, a verification result.

3. The method for providing authenticated caller information for voicemail of claim 2, further comprising:
   receiving, by the terminating telephony service provider system, a second request to retrieve voicemail from the UE the called party; and
   transmitting, by the terminating telephony service provider system, to the UE of the called party, the voicemail and the stored information from the SIP header mapped with the voicemail.

4. The method for providing authenticated caller information for voicemail of claim 1, wherein the terminating telephony service provider system is in communication with a 5G core of a 5G New Radio (NR) cellular network.

5. The method for providing authenticated caller information for voicemail of claim 2, wherein routing the telephone call to the voicemail system is based at least in part on the verification result.

6. The method for providing authenticated caller information for voicemail of claim 2, wherein the verification result classifies the telephone call as partially verified.

7. The method for providing authenticated caller information for voicemail of claim 1, wherein:
   attempting, by the terminating telephony service provider system, to complete the telephone call with the called party UE, wherein:

routing the telephone call to the voicemail system is performed in response to unsuccessfully attempting to complete the telephone call with the called party UE.

8. The method for providing authenticated caller information for voicemail of claim 1, further comprising:
calculating a reputation score using the SIP identity header; and
outputting an indication of the reputation score to the called party UE for presentation in association with the indication of the voicemail.

9. The method for providing authenticated caller information for voicemail of claim 8, wherein calculating the reputation score is performed using a machine learning model trained using SIP header information collected from a plurality of telephone calls.

10. The method for providing authenticated caller information for voicemail of claim 9, wherein the indication of the reputation score is only presented in association with the indication of the voicemail when the performed verification indicates the telephone call is either unverified or partially verified.

11. A voicemail system for providing authenticated caller information, the voicemail system comprising:
a 5G cellular network, wherein the 5G cellular network is operated by a terminating service provider, wherein the 5G cellular network is configured to:
receive a request to connect a telephone call, the request comprising a session initiation protocol (SIP) identity header, wherein:
the telephone call is mapped to an originating telephone number and was originated by a calling party outside of the 5G cellular network;
perform a verification based on the SIP identity header; and
a voicemail service system, in communication with a 5G core of the 5G cellular network, wherein the voicemail service system is configured to:
create a voicemail based on audio received from the calling party via the telephone call;
store information from the SIP header mapped with a voicemail; and
output, to a called party user equipment (UE), an indication of the voicemail with an indication of the verification based on the SIP identity header, wherein:
the indication of the verification indicates the telephone call from which the voicemail was created was partially verified; and
the telephone call being partially verified indicates that the terminating telephony service provider system has authenticated a call origination but did not verify the calling party is authorized to use the originating telephone number.

12. The voicemail system of claim 11, wherein the voicemail system further comprises a plurality of UE, the plurality of UE comprising the called party UE.

13. The voicemail system of claim 11, wherein the 5G cellular network being configured to perform the verification based on the SIP identity header comprises the 5G cellular network being configured to:
transmit the received SIP identity header to a verification service system; and
receive from the verification service system, a verification result.

14. The voicemail system of claim 11, wherein the voicemail service system is further configured to:
receive a second request to retrieve voicemail from the UE the called party; and
transmit, to the UE of the called party, the voicemail and the stored information from the SIP header mapped with the voicemail.

15. The voicemail system of claim 11, wherein routing the telephone call to the voicemail system is based at least in part on a verification result of the verification.

16. The voicemail system of claim 15, wherein the verification result classifies the telephone call as:
partially verified.

17. The voicemail system of claim 11, wherein the 5G cellular network is further configured to:
attempt to complete the telephone call with the called party UE, wherein:
the 5G cellular network routes the telephone call to the voicemail system in response to unsuccessfully attempting to complete the telephone call with the called party UE.

18. The voicemail system of claim 11, further comprising a certificate authority system distinct from the 5G cellular network, the certificate authority system being configured to:
calculate a reputation score using the SIP identity header; and
output an indication of the reputation score to the 5G cellular network for presentation in association with the indication of the voicemail at the called party UE.

19. The voicemail system of claim 18, wherein the certificate authority system being configured to calculate the reputation score comprises using a machine learning model trained using SIP header information collected from a plurality of telephone calls.

20. The voicemail system of claim 18, wherein the indication of the reputation score is presented in association with the indication of the voicemail when the performed verification indicates the telephone call is unverified.

* * * * *